US012566348B2

(12) United States Patent　　(10) Patent No.:　US 12,566,348 B2
Su et al.　　　　　　　　　　　　(45) Date of Patent:　　　Mar. 3, 2026

(54) DISPLAY DEVICE

(71) Applicant: Qisda Corporation, Taoyuan City (TW)

(72) Inventors: Yung-Chun Su, Taoyuan City (TW); Yu-Liang Cheng, Taoyuan City (TW); Sheng-Chan Chen, Taoyuan City (TW)

(73) Assignee: Qisda Corporation, Taoyuan City (TW)

( * ) Notice: Subject to any disclaimer, the term of this patent is extended or adjusted under 35 U.S.C. 154(b) by 560 days.

(21) Appl. No.: 18/070,485

(22) Filed: Nov. 29, 2022

(65) Prior Publication Data

US 2023/0352620 A1　　Nov. 2, 2023

(30) Foreign Application Priority Data

Apr. 27, 2022　(CN) ......................... 202210455166.7

(51) Int. Cl.
　　*G02F 1/13*　　　　(2006.01)
　　*G02F 1/1335*　　　(2006.01)
(52) U.S. Cl.
　　CPC .............................. *G02F 1/133618* (2021.01)
(58) Field of Classification Search
　　CPC ........... G02F 1/133618; G02F 2203/62; G02F 1/133605; G09F 9/30; F21V 14/04; F21V 33/0052; F21W 2131/30
　　See application file for complete search history.

(56) References Cited

U.S. PATENT DOCUMENTS

| | | | |
|---|---|---|---|
| 2008/0111958 A1 | 5/2008 | Kleverman et al. | |
| 2015/0276148 A1* | 10/2015 | Tanabe | F21V 7/09 |
| | | | 362/346 |
| 2022/0083096 A1* | 3/2022 | Oh | G02F 1/133317 |
| 2022/0146747 A1* | 5/2022 | Cai | G02B 6/0031 |
| 2022/0390087 A1* | 12/2022 | Chen | G02F 1/133607 |

FOREIGN PATENT DOCUMENTS

| | | | | |
|---|---|---|---|---|
| CN | 202469611 | | 10/2012 | |
| CN | 110031998 | | 7/2019 | |
| CN | 114373786 | | 4/2022 | |
| JP | 2010220719 | | 10/2010 | |
| TW | 201924040 | | 6/2019 | |
| TW | M609724 | | 4/2021 | |
| WO | WO 2008056276 | * | 5/2008 | ........... G02F 1/1335 |

OTHER PUBLICATIONS

"Office Action of China Counterpart Application", issued on Aug. 29, 2025, p. 1-p. 7.

* cited by examiner

*Primary Examiner* — Towfiq Elahi

(57)　　　　　ABSTRACT

A display device includes a display, at least one light emitting element and at least one reflector. The display has a display surface and a back surface opposite to each other, and the display surface faces a front of the display. The light emitting element is disposed on the back surface. The reflector is slidably connected to the back surface and has a reflecting surface. When the reflector slides to a first position, the reflecting surface is hidden. When the reflector slides to a second position, the reflecting surface is exposed, such that light emitted from the light emitting element is reflected toward the front of the display by the reflecting surface.

19 Claims, 19 Drawing Sheets

DISPLAY DEVICE

CROSS-REFERENCE TO RELATED APPLICATION

This application claims the priority benefit of China application serial no. 202210455166.7, filed on Apr. 27, 2022. The entirety of the above-mentioned patent application is hereby incorporated by reference herein and made a part of this specification.

BACKGROUND

Technical Field

The invention relates to a display device, and particularly relates to a display device provided with light emitting elements on a back surface thereof.

Description of Related Art

Along with development of e-sports industry, a market demand for e-sports displays has gradually increased. Under a trend of a borderless design of the e-sports displays, it is difficult to set situational light on the front of the display but may only set the same on a back surface of the display. As a result, users in the front of the display may hardly see an effect of the situational light and the significance of setting the situational light is lost. Even if the back surface of the display is placed adjacent to a wall to reflect the light emitted by the situational light through indirect lighting, the effect of the situational light viewed by the users is still limited.

SUMMARY

The invention is directed to a display device, which is adapted to provide users with a prominent situational light effect.

The invention provides a display device including a display, at least one light emitting element and at least one reflector. The display has a display surface and a back surface opposite to each other, and the display surface faces a front of the display. The light emitting element is disposed on the back surface. The reflector is slidably connected to the back surface and has a reflecting surface. When the reflector slides to a first position, the reflecting surface is hidden. When the reflector slides to a second position, the reflecting surface is exposed, such that light emitted from the light emitting element is reflected toward the front of the display by the reflecting surface.

In an embodiment of the invention, the reflector is slidably arranged on the display along a direction parallel to the display surface.

In an embodiment of the invention, when the reflector is in the first position and is retracted on the back surface, the reflecting surface is overlapped with the display in a direction perpendicular to the display surface.

In an embodiment of the invention, when the reflector is in the second position and is expanded on the back surface, the reflecting surface is misaligned with the display in a direction perpendicular to the display surface.

In an embodiment of the invention, the display has a top edge, a bottom edge opposite to the top edge and two opposite side edges, the top edge and the bottom edge are connected between the two side edges, and the reflector includes a top edge reflector, at least one side edge reflector and at least one corner reflector. The top edge reflector corresponds to the top edge and is adapted to be expanded along a first direction, and the side edge reflector corresponds to the side edge and is adapted to be expanded along a second direction or a third direction, and the corner reflector is located between the top edge reflector and the side edge reflector or located at the bottom edge and is adapted to be expanded along the third direction or the second direction. The first direction is parallel to the display surface and perpendicular to the top edge, the second direction is parallel to the display surface and perpendicular to the side edge, and the third direction is parallel to the display surface and inclined to the top edge.

In an embodiment of the invention, a number of the side edge reflectors is two, the two side edge reflectors respectively correspond to the two side edges, a number of the corner reflectors is two, one corner reflector is located between the top edge reflector and one side edge reflector or located at an end of the bottom edge, and the other corner reflector is located between the top edge reflector and the other side edge reflector or located at another end of the bottom edge.

In an embodiment of the invention, the top edge reflector is slidably arranged on the display along the first direction, the side edge reflector is slidably arranged on the display along the second direction or the third direction, and the corner reflector is slidably arranged on the top edge reflector along the second direction and slidably arranged on the side edge reflector along the first direction, or is slidably arranged on the at least one side edge reflector along the first direction and separated from the top edge reflector.

In an embodiment of the invention, the display device includes at least one push-push mechanism and at least one elastic component, where the push-push mechanism is arranged on the display, the elastic component is connected between the top edge side reflector and the display, and the top edge reflector is adapted to be restricted by the push-push mechanism to retract on the back surface, and when the top edge reflector is released by the push-push mechanism, the top edge reflector is expanded on the back surface by an elastic force of the elastic component.

In an embodiment of the invention, the display includes a display main body and at least one sliding rail, the sliding rail is arranged on the display main body, the top edge reflector is slidably arranged on the sliding rail, and the elastic component is arranged in the sliding rail.

In an embodiment of the invention, the display device includes at least one linkage mechanism, where the linkage mechanism is coupled between the top edge reflector and the side edge reflector, and the top edge reflector and the side edge reflector are adapted to be linked by the linkage mechanism.

In an embodiment of the invention, the linkage mechanism includes a first rack, at least one second rack and at least one gear, the first rack is arranged on the top edge reflector, the at least one second rack is arranged on the side edge reflector, the at least one gear is arranged on the display and meshes between the first rack and the second rack. The first rack is extended along the first direction, and the at least one second rack is extended along the second direction or the third direction In an embodiment of the invention, a number of the light emitting elements is plural, and the light emitting elements are distributed on the top edge and the side edges.

In an embodiment of the invention, the display has a first carrying surface, at least one second carrying surface and at least one third carrying surface. The first carrying surface corresponds to and is parallel to the top edge, the second carrying surface corresponds to and is parallel to the side edge, and the third carrying surface is connected between the first carrying surface and the second carrying surface and is inclined to the first carrying surface and the second carrying surface, and the light emitting elements are arranged on the first carrying surface, the second carrying surface and the third carrying surface.

In an embodiment of the invention, the display device includes at least one light equalizing element, where the light equalizing element is disposed between the light emitting element and the reflecting surface.

In an embodiment of the invention, the light emitting elements correspond to a peripheral region of the display surface, and the light emitting elements are adapted to emit corresponding color light according to a color displayed by the display surface on the peripheral region.

The invention provides a display device including a display, a plurality of light emitting elements and two side edge reflectors. The display has a display surface and a back surface opposite to each other, and has two opposite side edges, and the display surface faces a front of the display. The light emitting elements are arranged on the back surface and distributed on the two side edges. The two side edge reflectors are slidably connected to the display and respectively correspond to the two side edges. Each of the side edge reflectors has a reflecting surface, and is adapted to be retracted on the back surface to hide the reflecting surface. Each of the side edge reflectors is adapted to be expanded on the back surface to expose the reflecting surface, so that light emitted by the corresponding light emitting element is reflected toward the front of the display by the reflecting surface.

In an embodiment of the invention, each of the side edge reflectors is slidably arranged on the display along a direction parallel to the display surface.

In an embodiment of the invention, when each of the side edge reflectors is retracted on the back surface, the reflecting surface is overlapped with the display in a direction perpendicular to the display surface.

In an embodiment of the invention, when each of the side edge reflectors is expanded on the back surface, the reflecting surface is misaligned with the display in a direction perpendicular to the display surface.

In an embodiment of the invention, the display device includes at least one light equalizing element, where the light equalizing element is disposed between the reflecting surface and the corresponding light emitting element.

Based on the above description, in the display device of the invention, slidable reflectors are provided on the back surface of the display. When the light emitting elements on the back surface of the display do not need to be used to provide a situational light effect, the reflectors may be slid to a first position to hide the reflectors. When the light emitting elements on the back surface of the display need to be used to provide the situational light effect, the reflectors may be slid to a second position to expose the reflecting surfaces, so that the light emitted by the light emitting elements may be reflected to the user at the front of the display by the reflecting surfaces to provide the user with a prominent situational light effect.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
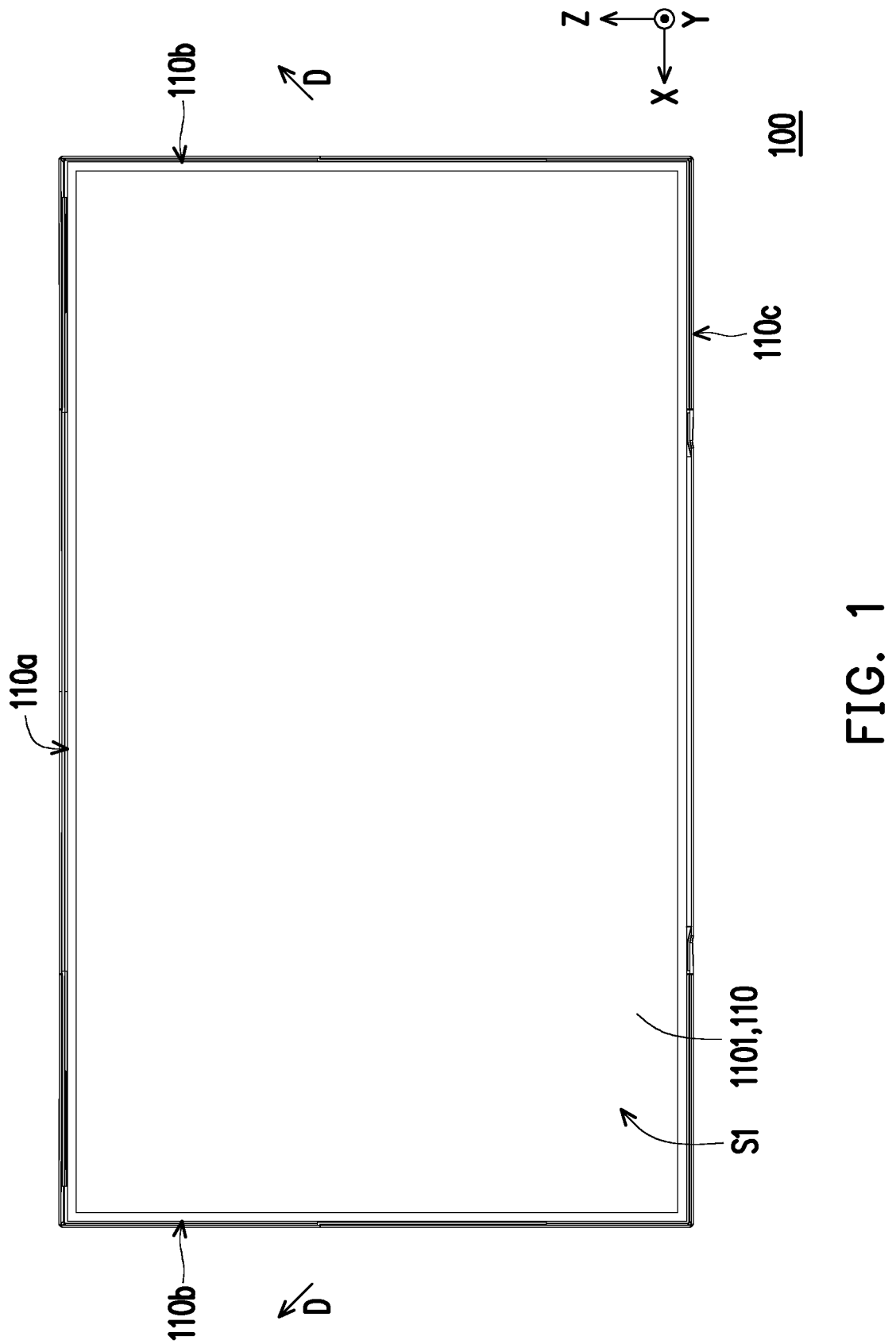
FIG. 1 is a front view of a display device according to an embodiment of the invention.
Figure 2:
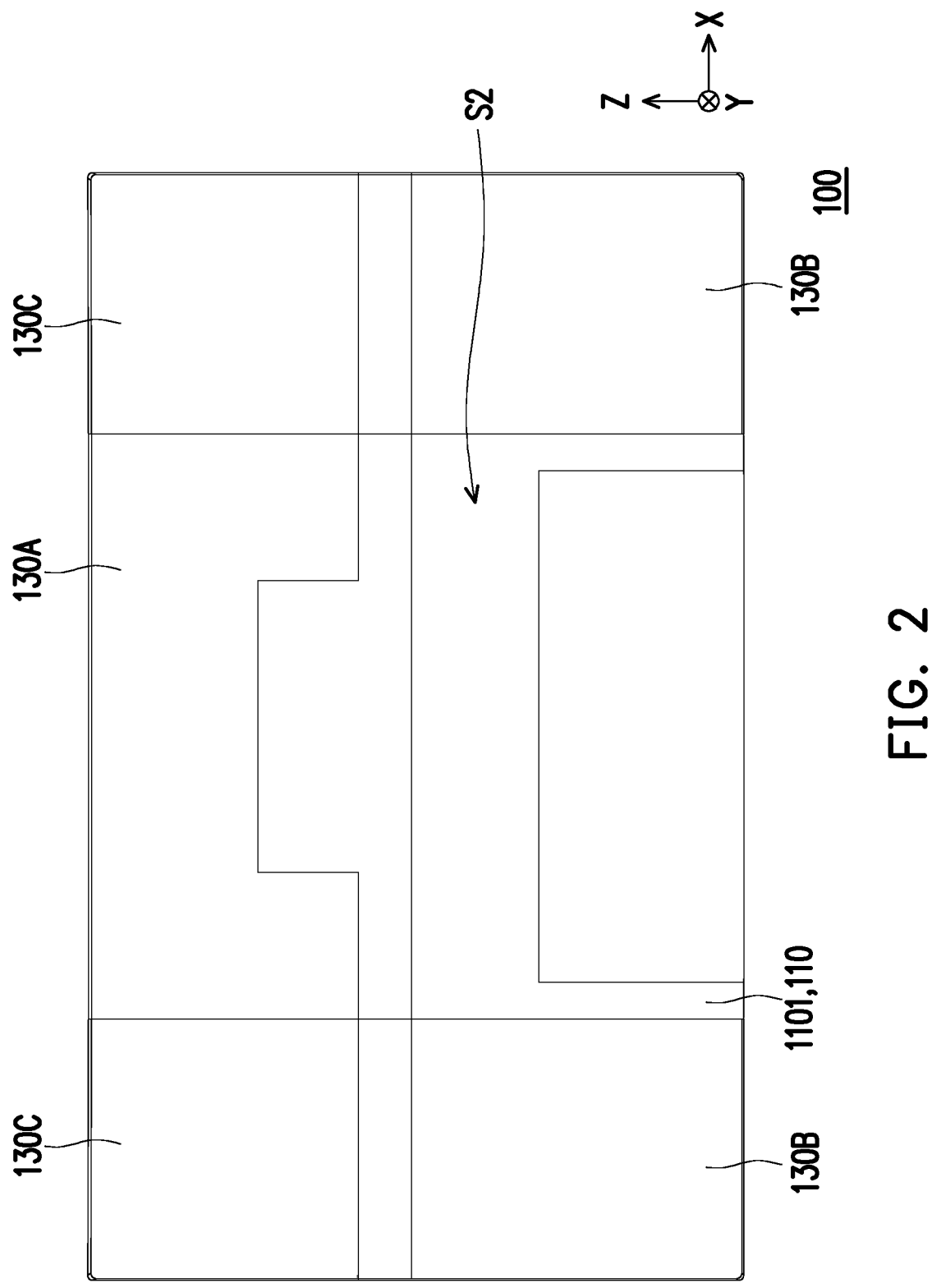
FIG. 2 is a rear view of the display device of FIG. 1.
Figure 3:
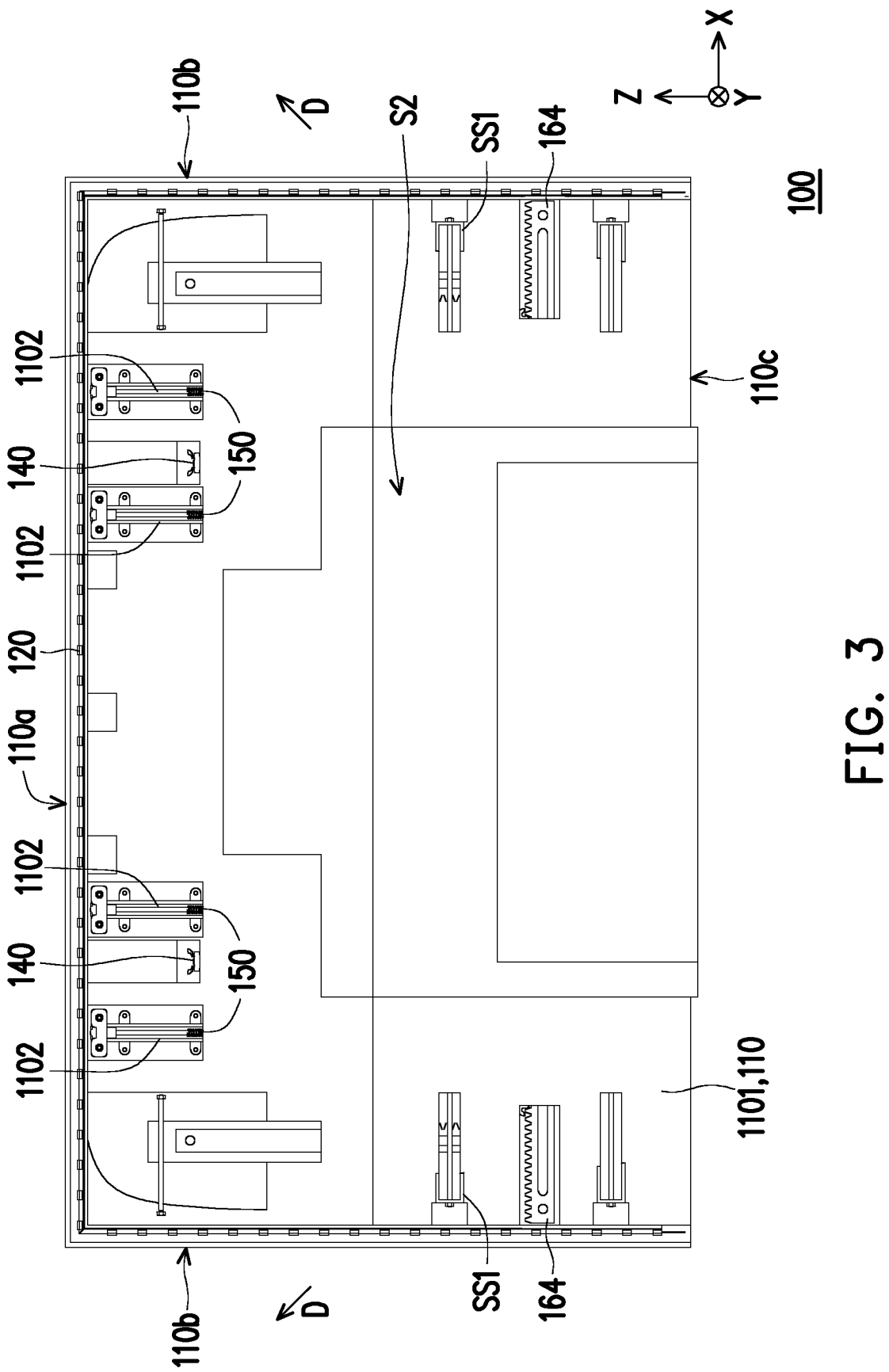
FIG. 3 illustrates some components of the display device of FIG. 2.

FIG. 1 is a front view of a display device according to an embodiment of the invention. FIG. 2 is a rear view of the display device of FIG. 1. FIG. 3 illustrates some components of the display device of FIG. 2. Referring to FIG. 1 to FIG. 3, a display device 100 of the embodiment includes a display 110, a plurality of light emitting elements 120 and a plurality of reflectors (shown as a top edge reflector 130A, two side edge reflectors 130B, and two corner reflectors 130C). The display 110 has a display surface S1 and a back surface S2 opposite to each other and has a top edge 110a, a bottom edge 110c opposite to the top edge 110a and two side edges 110b opposite to each other. The display surface S1 faces a front of the display 110 along an axial direction Y, and the top edge 110a and the bottom edge 110c are connected between the two side edges 110b. The light emitting elements 120 are disposed on the back surface S2 of the display 110a and are distributed on the top edge 110a and the side edges 110b. The light emitting elements 120 in the embodiment are, for example, a plurality of light emitting diodes on a light emitting diode light bar, but the invention is not limited thereto.

Figure 4:
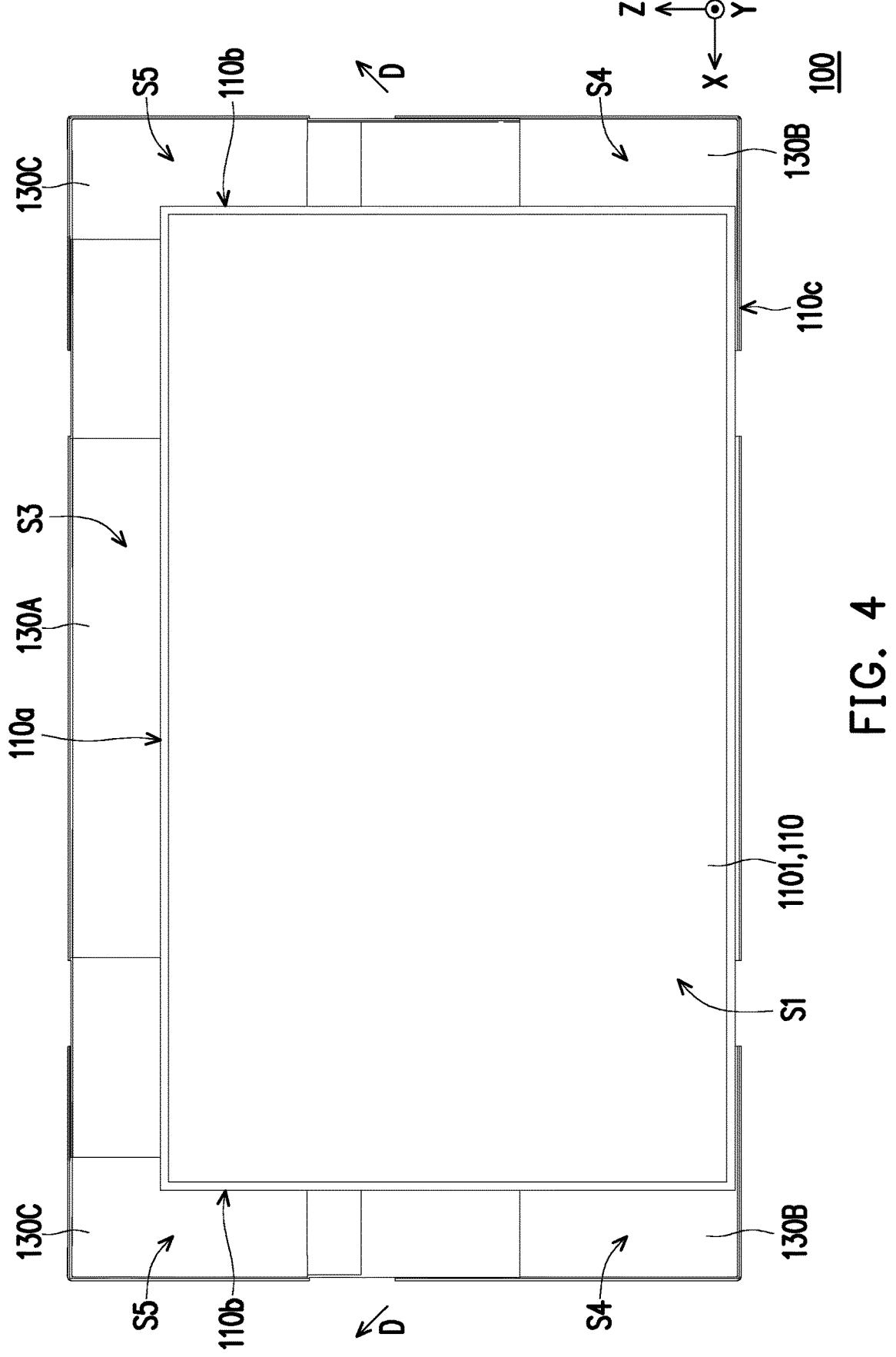
FIG. 4 illustrates a movement of the reflectors of FIG. 1.
Figure 5:
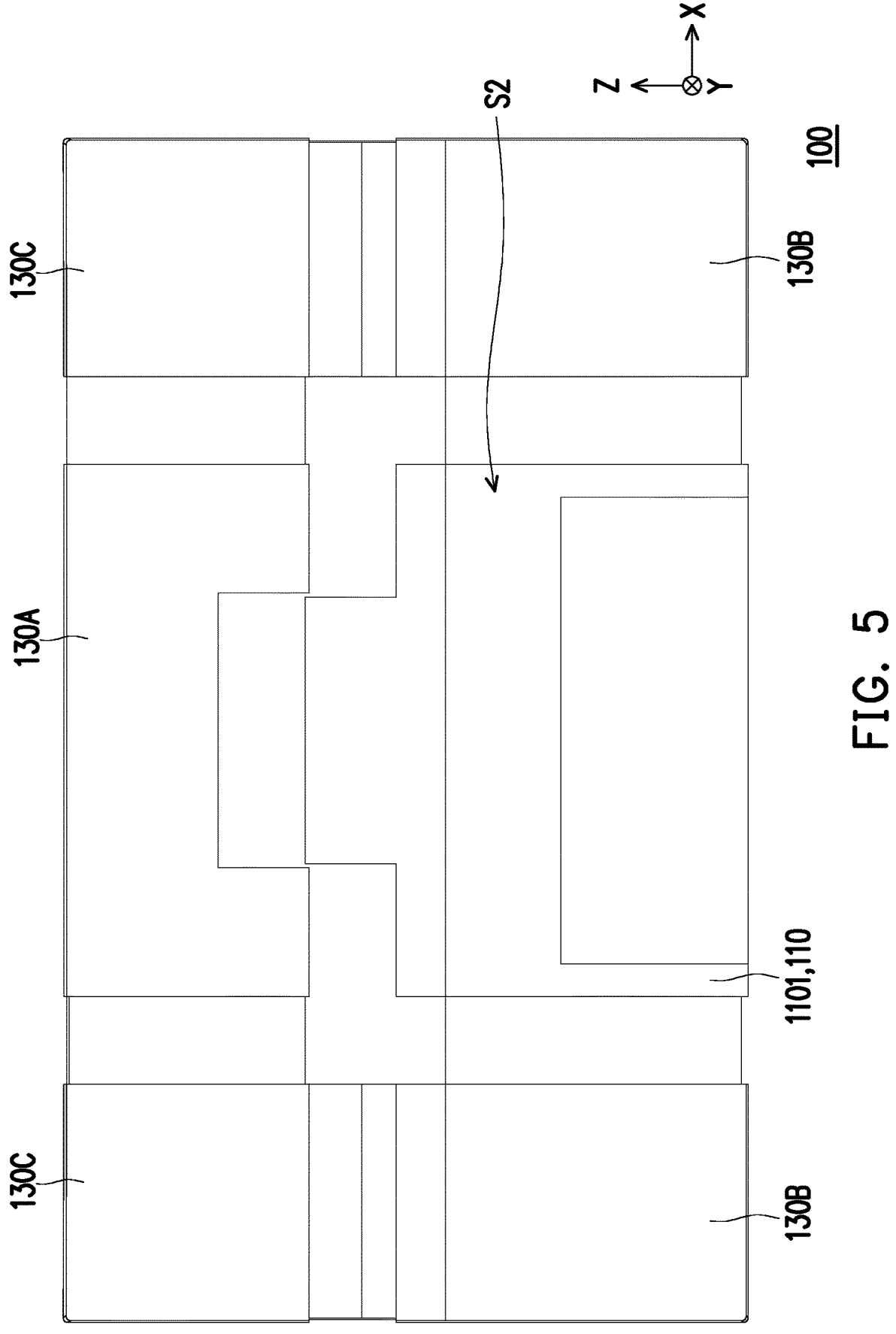
FIG. 5 is a rear view of the display device of FIG. 4.

FIG. 4 illustrates a movement of the reflectors of FIG. 1. FIG. 5 is a rear view of the display device of FIG. 4. Referring to FIG. 4 and FIG. 5, the top edge reflector 130A is slidably connected to the back surface S2 of the display 110a along a first direction (an axial direction Z) parallel to the display surface S1 and perpendicular to the top edge 110a and corresponds to the top edge 110a of the display 110, and has a reflecting surface S3. The two side edge reflectors 130B are slidably connected to the back surface S2 of the display 110a along a second direction (an axial direction X) parallel to the display surface S1 and perpendicular to the side edge 110b, and respectively correspond to the two side edges 110b of the display 110, and each of the two side edge reflectors 130B has a reflecting surface S4. The two corner reflectors 130C are slidably connected to the back surface S2 of the display 110a along the first direction (the axial direction X) and the second direction (the axial direction Z) parallel to the display surface S 1, and one corner reflector 130C is located between the top edge reflector 130A and one side edge reflector 130B and has a reflecting surface S5, and the other corner reflector 130C is located between the top edge reflector 130A and the other side edge reflector 130B and has another reflecting surface S5.

When the light emitting elements 120 on the back surface S2 of the display 110 do not need to be used to provide a situational light effect, the top edge reflector 130A, the side edge reflectors 130B, and the corner reflectors 130C may be slid to a first position (which may be regarded as a retracted position) on as shown in FIG. 1 and FIG. 2, and the reflecting surfaces S3, S4, and S5 are hidden behind the display 110. When the light emitting elements 120 on the back surface S2 of the display 110 need to be used to provide the situational light effect, the top edge reflector 130A may be expanded along the first direction (the axial direction Z), the side edge reflectors 130B may be expanded along the second direction (the axial direction X), and the corner reflectors 130C may be expanded along a third direction D which is parallel to the display surface S1 and inclined to the first direction (the axial direction Z), so that these reflectors are slid to a second position (which may be regarded as an expanded position) as shown in FIG. 4 and FIG. 5 to expose the reflecting surfaces S3, S4 and S5. In this way, the light emitted by the light emitting elements 120 may be reflected by the reflecting surfaces S3, S4, and S5 toward the user at the front of the display 110, so as to provide the user with a prominent situational light effect.

Figure 6:
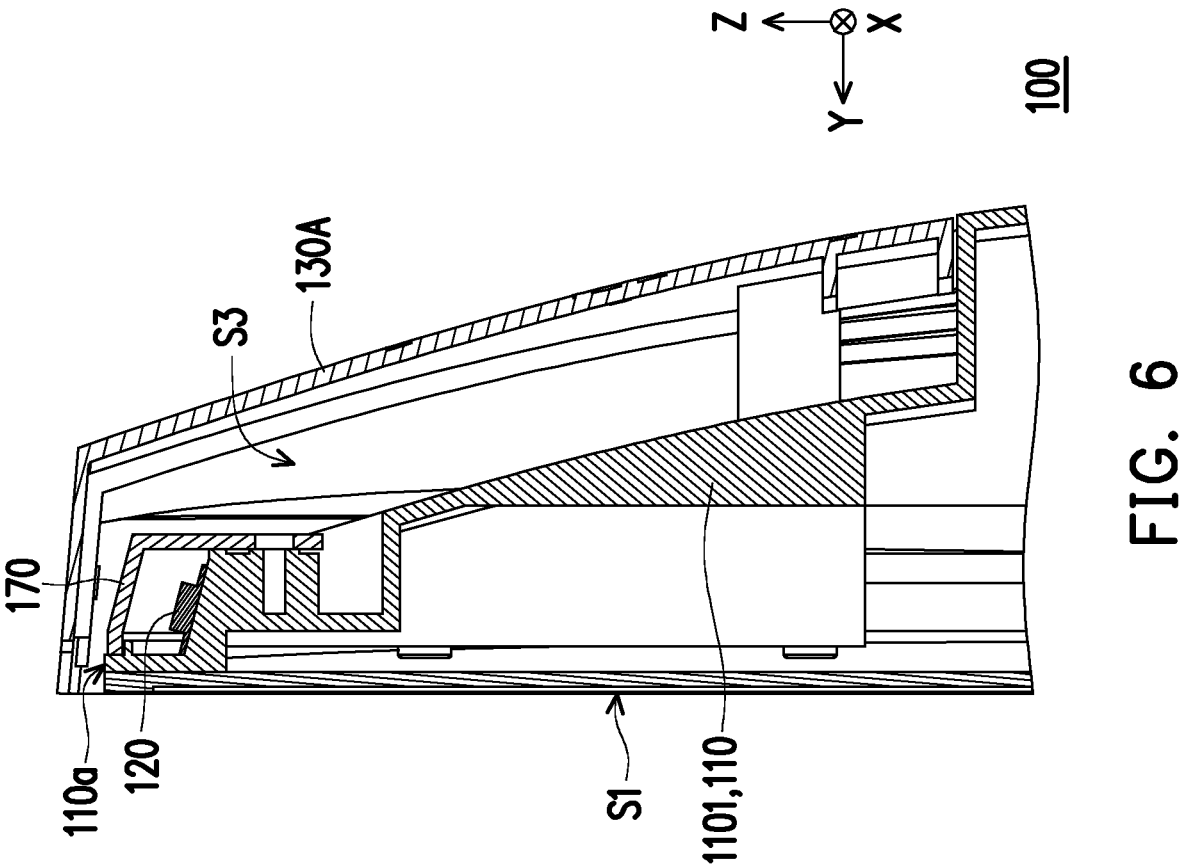
FIG. 6 is a partial cross-sectional view of the display device of FIG. 1.
Figure 7:
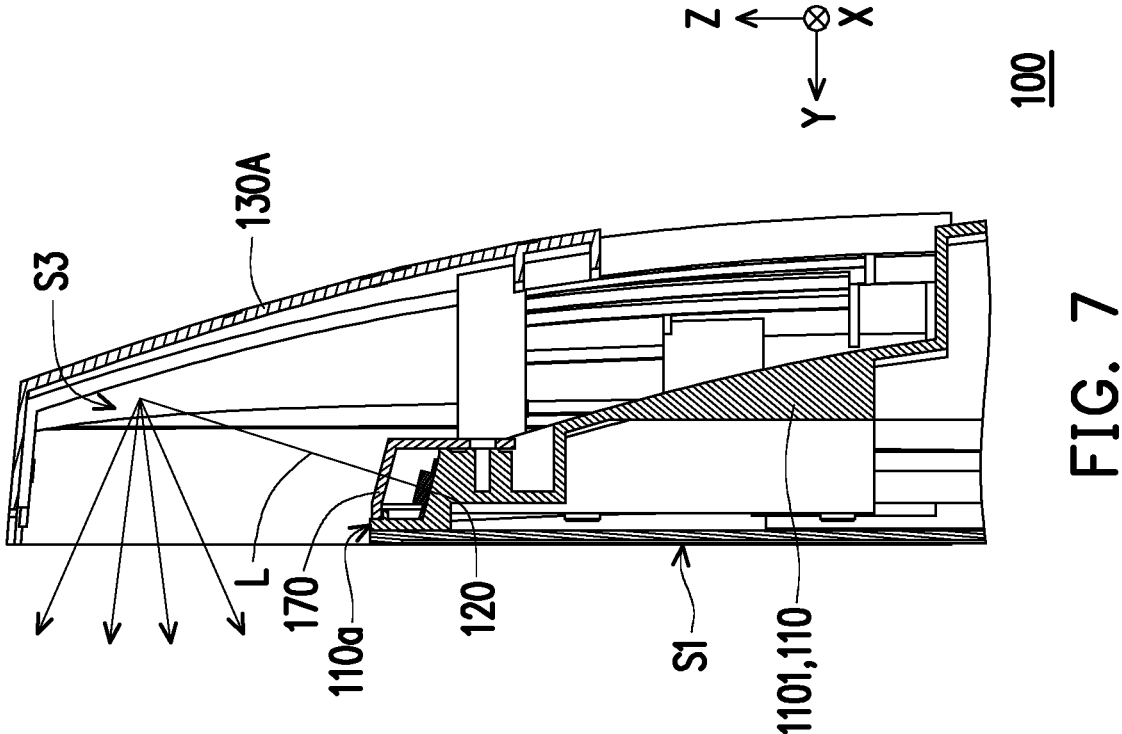
FIG. 7 is a partial cross-sectional view of the display device of FIG. 4.

Following figures are provided to show the situation that the light emitted by the light emitting element is reflected by the reflecting surface. FIG. 6 is a partial cross-sectional view of the display device of FIG. 1. FIG. 7 is a partial cross-sectional view of the display device of FIG. 4. Taking the reflecting surface S3 of the top edge reflector 130A shown in FIG. 6 and FIG. 7 as an example, when the top edge reflector 130A is slid from the retracted position shown in FIG. 6 to the expanded position shown in FIG. 7, the light L emitted by the light emitting element 120 may be reflected toward the front of the display 110 by the reflecting surface S3. The functions of the reflecting surfaces S4 of the side edge reflectors 130B and the reflecting surfaces S5 of the corner reflectors 130C are also the same, and details thereof are not repeated.

In the embodiment, when the top edge reflector 130A, the side edge reflectors 130B and the corner reflectors 130C are retracted on the back surface S2 of the display 110 at the first position as shown in FIG. 1 and FIG. 2, the reflecting surfaces S3, S4, and S5 are overlapped with the display 110 in a direction perpendicular to the display surface S1 (the axial direction Y), so that the reflecting surfaces S3, S4, and S5 are hidden as that described above. Conversely, when the top edge reflector 130A, the side edge reflectors 130B and the corner reflectors 130C are expanded on the back surface S2 of the display 110 at the second position as shown in FIG. 4 and FIG. 5, the reflecting surfaces S3, S4, and S5 are misaligned with the display 110 in the direction perpendicular to the display surface S1 (the axial direction Y), so that the reflecting surfaces S3, S4 and S5 are exposed as described above.

The invention does not limit the numbers and arrangement positions of the reflectors. For example, in other embodiments, only the two side edge reflectors 130B may be configured, and the top edge reflector 130A and the corner reflectors 130C may be omitted, or the reflectors may be configured in other appropriate numbers and positions.

Figure 8:
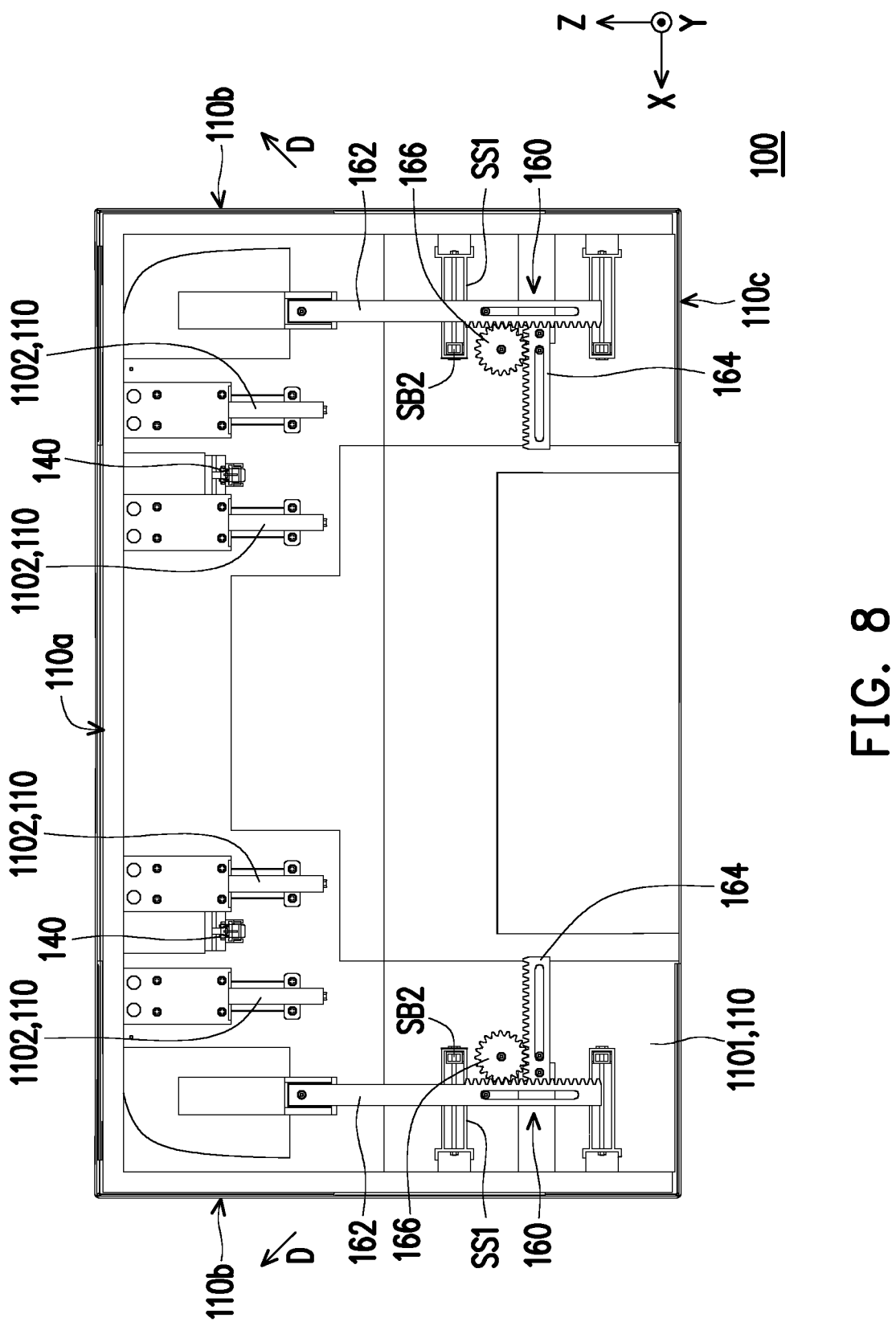
FIG. 8 and FIG. 9 respectively show internal components of the display device of FIG. 1 and FIG. 4.
Figure 9:
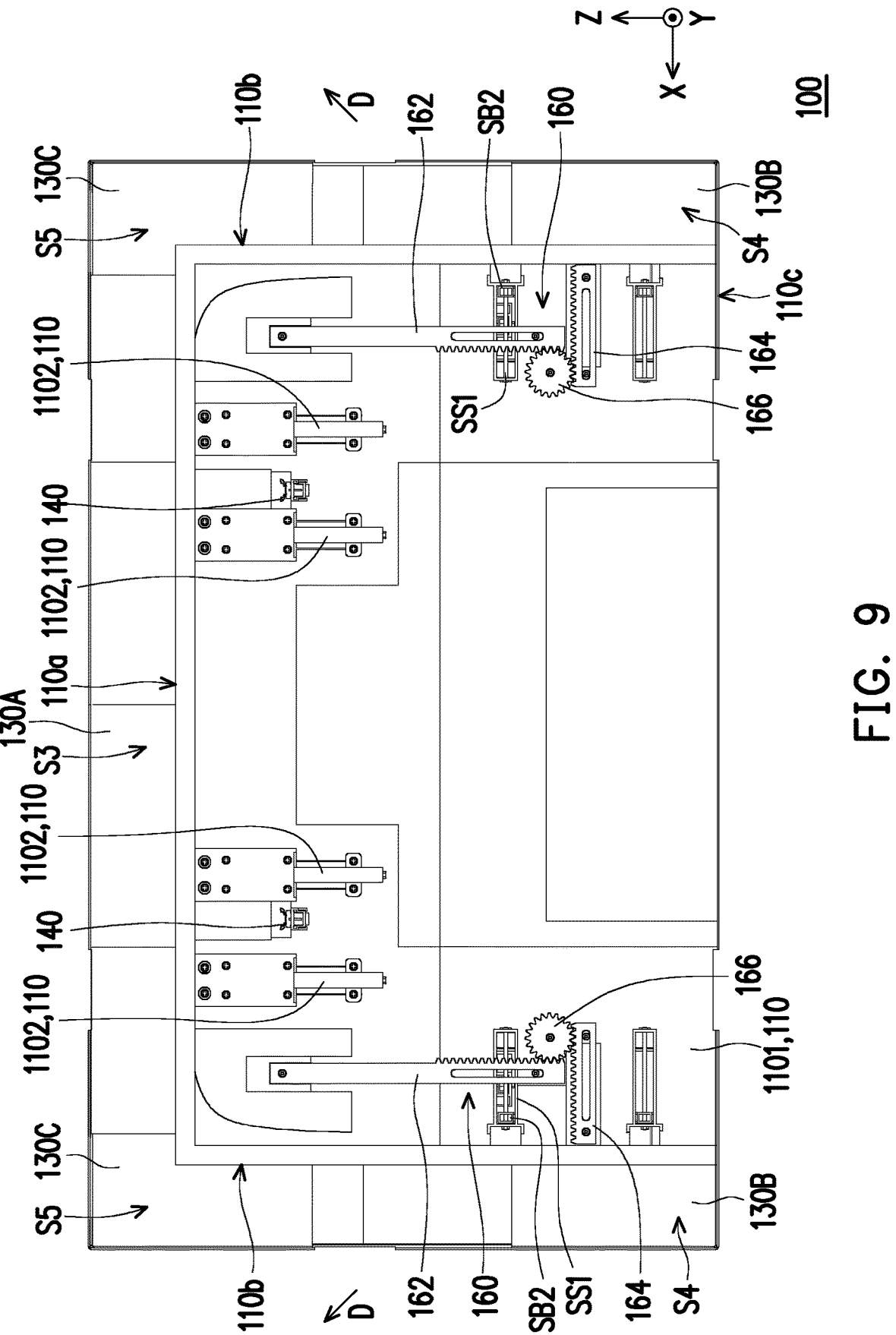
Figure 10:
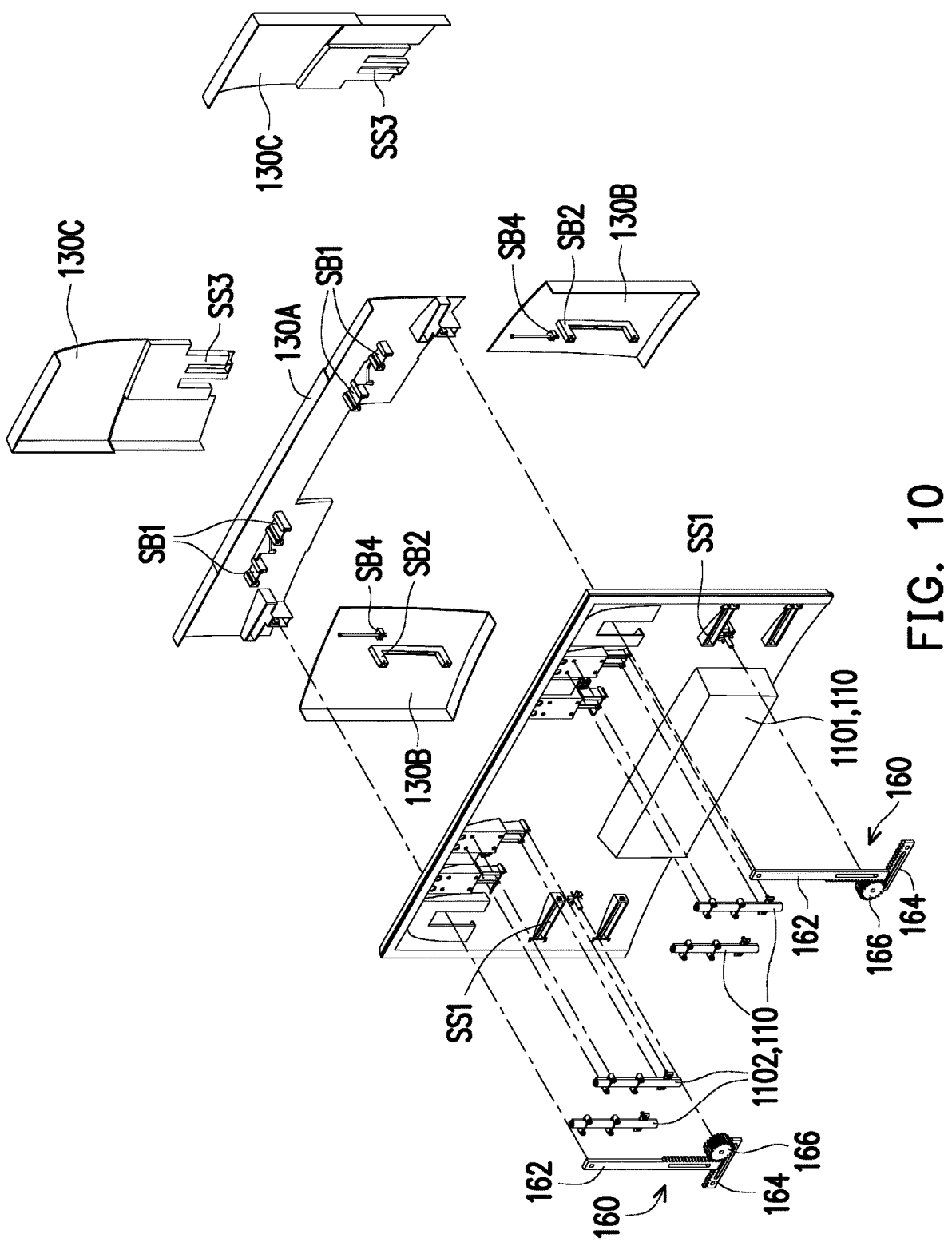
FIG. 10 and FIG. 11 are respectively exploded views of a display of FIG. 1 at different viewing angles.
Figure 11:
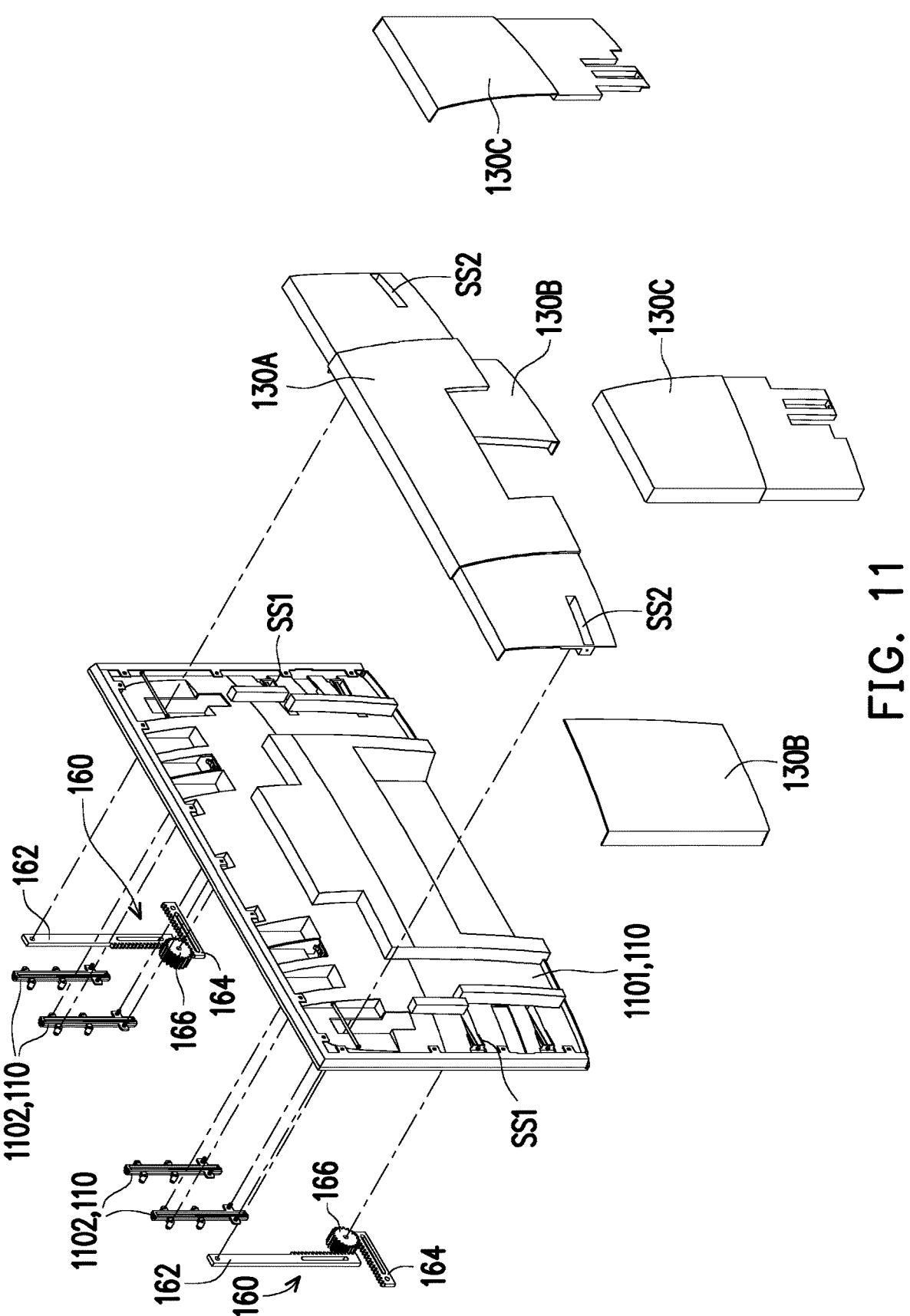

A specific sliding manner of each reflector in the embodiment will be described below with reference to the drawings. FIG. 8 and FIG. 9 respectively show internal components of the display device of FIG. 1 and FIG. 4. FIG. 10 and FIG. 11 are respectively exploded views of the display of FIG. 1 at different viewing angles. Referring to FIG. 8 to FIG. 11, in the embodiment, the display 110 includes a display main body 1101 and a plurality of sliding rails 1102. The sliding rails 1102 are disposed on the display main body 1101, and the top edge reflector 130A is slidably disposed on the sliding rails 1102 of the display 110 along the first direction (the axial direction Z) through a sliding block SB1. In addition, each side edge reflector 130B is slidably disposed on a sliding groove SS1 of the display 110 along the second direction (the axial direction X) through a sliding block SB2, and each corner reflector 130C is slidably disposed on a sliding groove SS2 of the top edge reflector 130A along the second direction (the axial direction X) through a sliding block SB3, and slidably disposed on a sliding block SB4 of the corresponding side edge reflector 130B along the first direction (the axial direction Z) through a sliding groove SS3. In other embodiments, each reflector mat be slidably arranged by other suitable structures, which is not limited by the invention.

Figure 12:
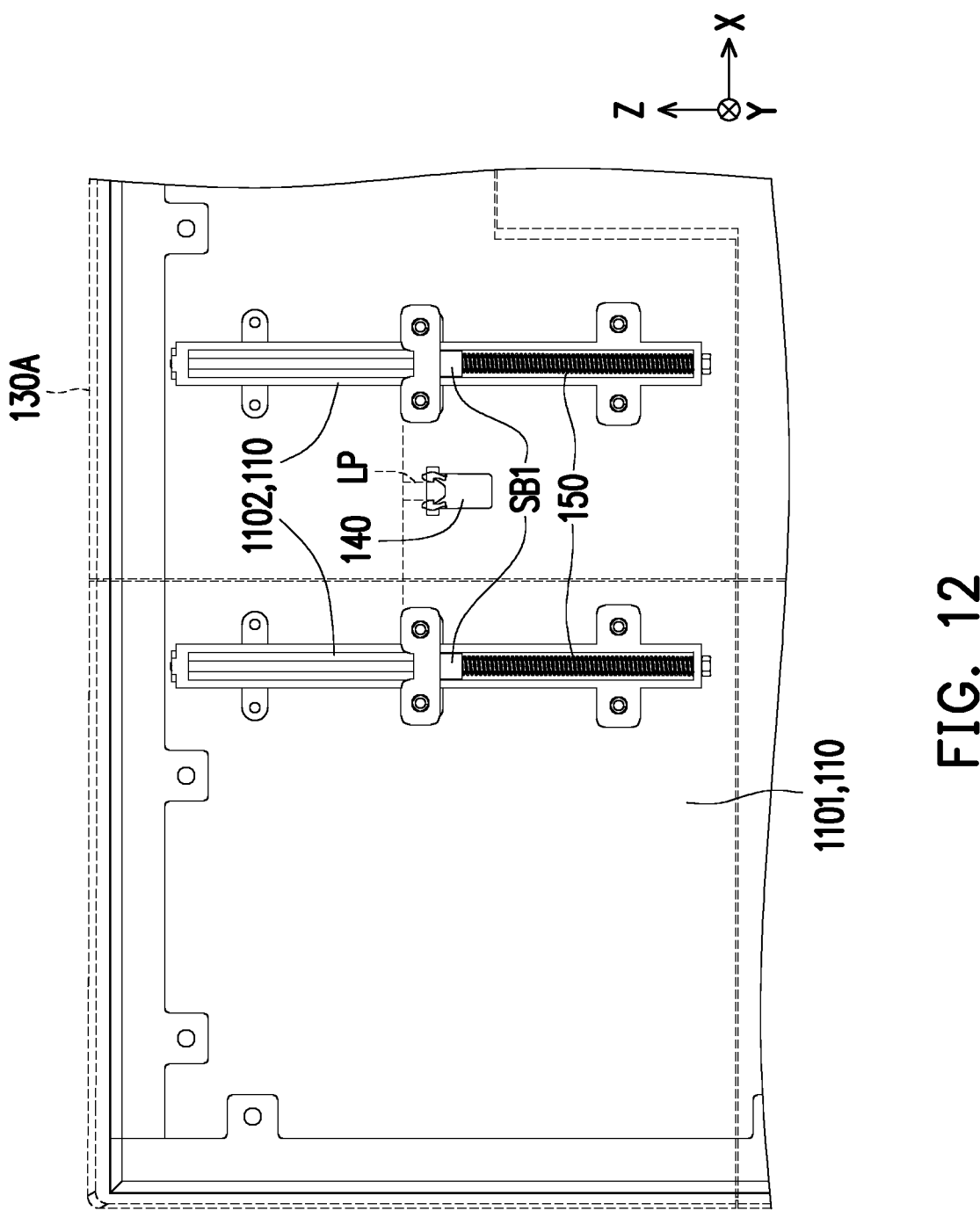
FIG. 12 is a partial enlarged view of the display device of FIG. 1.
Figure 13:
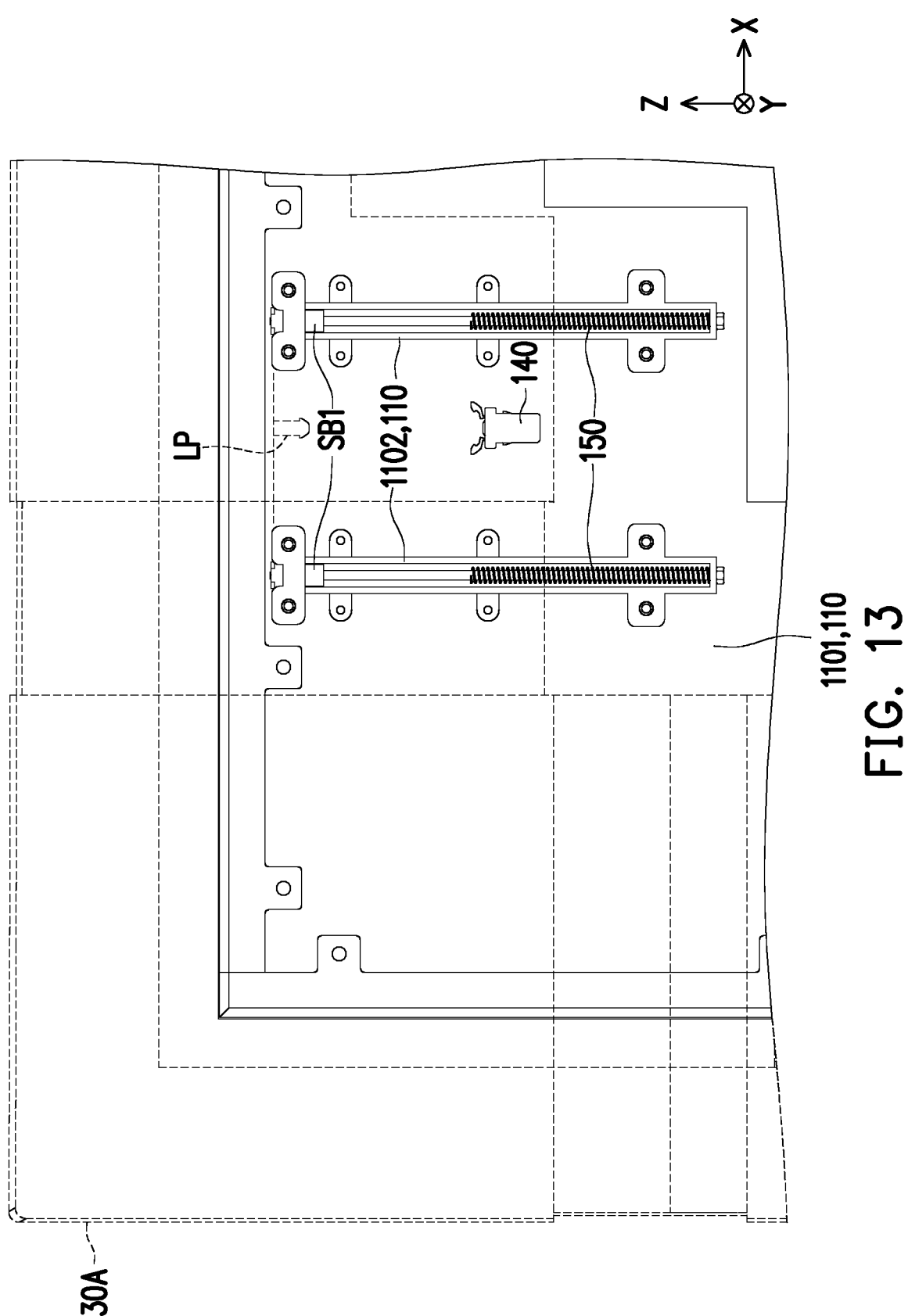
FIG. 13 is a partial enlarged view of the display device of FIG. 4.

A specific linkage manner of each of the reflectors of the embodiment is described below. FIG. 12 is a partial enlarged view of the display device of FIG. 1. FIG. 13 is a partial enlarged view of the display device of FIG. 4. Referring to FIG. 8, FIG. 9, FIG. 12 and FIG. 13, the display device 100 of the embodiment includes a plurality of push-push mechanisms 140 and a plurality of elastic components 150, the push-push mechanisms 140 are disposed on the display main body 1101, the elastic components 150 are disposed in the slide rails 1102 and connected between the top edge reflector 130A and the display main body 1101. The top edge reflector 130A is adapted to be retracted to the back surface S2 of the display 110 by the push-push mechanism 140 through a locking portion LP, as shown in FIG. 1, FIG. 2 and FIG. 12. When the top edge reflector 130A is pressed down by the user so that the locking portion LP is released by the push-push mechanism 140, the top edge reflector 130A is expanded upward on the back surface S2 of the display 110 by an elastic force of the elastic component 150, as shown in FIG. 4, FIG. 5 and FIG. 13. The function of the push-push mechanism 140 is known in the technical field, and detail thereof is not repeated.

Based on the above descriptions, referring to FIG. 8 to FIG. 11, the display device 100 in the embodiment includes two linkage mechanisms 160, each of the linkage mechanisms 160 is coupled between the top edge reflector 130A and the side edge reflector 130B. The top edge reflector 130A and the side edge reflectors 130B may be linked by the linkage mechanisms 160. In this way, when the top edge reflector 130A is expanded upward on the back surface S2 of the display 110 by the elastic force of the elastic component 150 as described above, the side edge reflector 130b may be accordingly expanded laterally on the back surface S2 of the display 110. In detail, the linkage mechanism 160 of the embodiment includes a first rack 162, a second rack 164 and a gear 166. The first rack 162 is disposed on the top edge reflector 130A and extend along the first direction (the axial direction Z), the second rack 164 is disposed on the side edge reflector 130B and extends along the second direction (the axial direction X), the gear 166 is disposed on the display main body 1101 and meshes between the first rack 162 and the between the second racks 164. When the first rack 162 moves up and down along with the top edge reflector 130A, the first rack 162 drives the second rack 164 to traverse through the gear 166, thereby causing the side edge reflector 130B to traverse. In other embodiments, the linkage mechanism may be a linkage group or other suitable forms of linkage mechanism, which is not limited by the invention.

Figure 14:
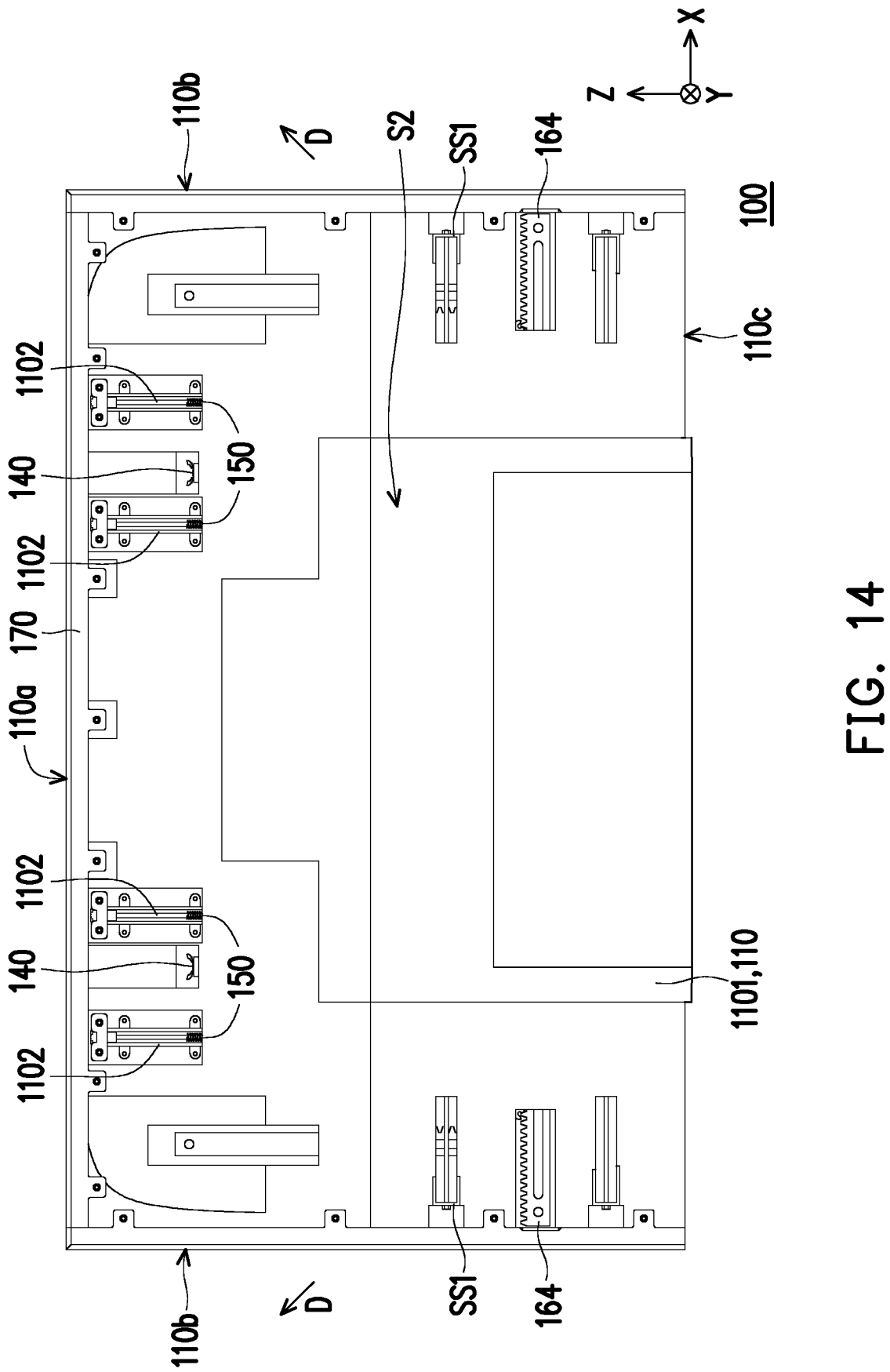
FIG. 14 illustrates some components of the display device of FIG. 2.

FIG. 14 illustrates some components of the display device of FIG. 2. Referring to FIG. 7 and FIG. 14, in the embodiment, the display device 100 includes a light equalizing element 170, and the light equalizing element 170 is disposed between the light emitting elements 120 and the reflecting surfaces S3, S4, and S5. The light L emitted by the light emitting elements 120 may be atomized by the light equalizing element 170 to provide the user with uniform and soft situational light. In addition, referring to FIG. 3 and FIG. 4, the light emitting elements 120 of the embodiment respectively correspond to different parts of the peripheral region of the display surface S 1, and each light emitting element 120 is adapted to emit corresponding color light according to the color displayed by the display surface 110A in different parts of the peripheral region, so as to make the display image to have an outward-extending visual effect. In other embodiments, the light emitting elements 120 may be set to emit light in other ways, which is not limited by the invention.

Figure 15:
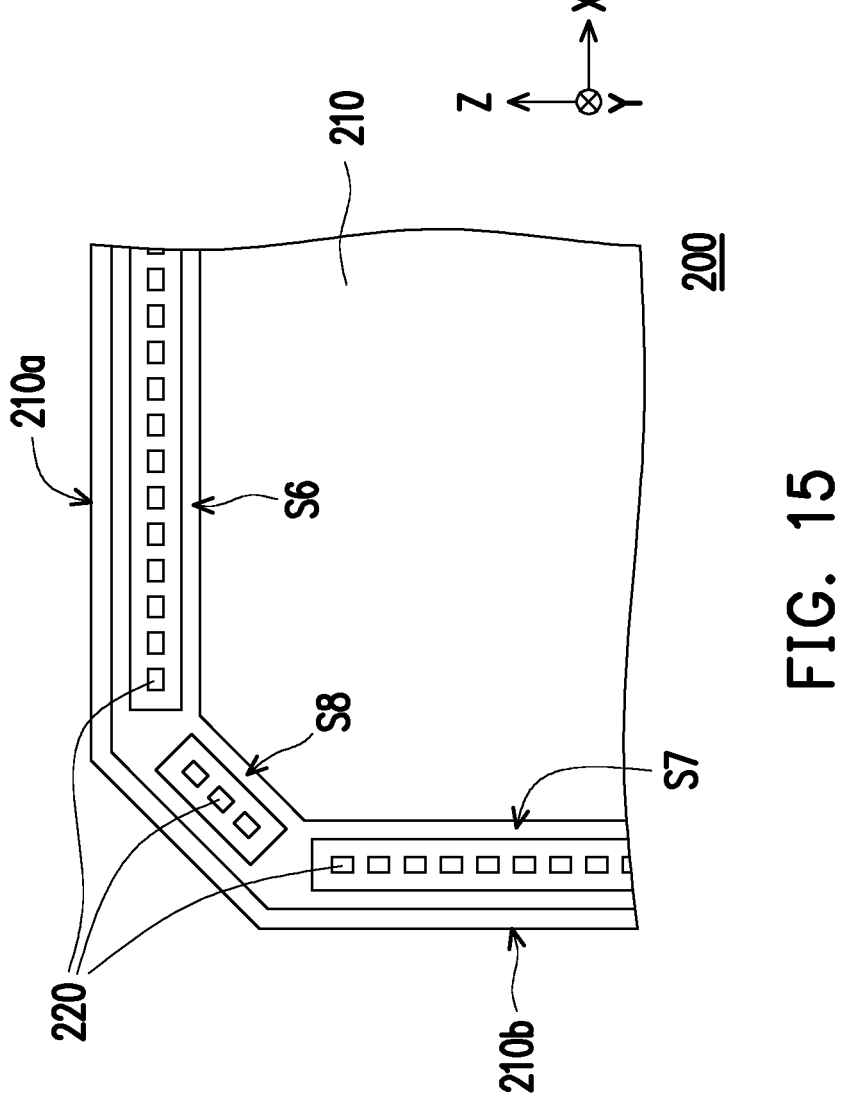
FIG. 15 is a schematic diagram of some components of a display device according to another embodiment of the invention.

FIG. 15 is a schematic diagram of some components of a display device according to another embodiment of the invention. Most of the configurations and functions of a display device 200 of the embodiment shown in FIG. 15 are the same or similar to that of the display device 100 of the previous embodiment, so that details thereof are not repeated, and components that are the same or similar to that of the previous embodiment are denoted by the same or similar reference numerals in FIG. 15. In the display device 200, a display 210 has a first carrying surface S6, at least one second carrying surface S7 and at least one third carrying surface S8. The first carrying surface S6 corresponds to and is parallel to a top edge 210 of the display 210, the second carrying surface S7 corresponds to and is parallel to a side edge 210b of the display 210, and the third carrying surface S8 is connected between the first carrying surface S6 and the second carrying surface S7 and is inclined to the first carrying surface S6 and the second carrying surface S7, and the light emitting elements 220 are disposed on the first carrying surface S6 and the second carrying surface S7 and the third carrying surface S8. As described above, the inclined third carrying surface S8 is formed between the first carrying surface S6 and the second carrying surface S7, so that the light emitting elements 220 on the third carrying surface S8 may directly emit light to the corners of the display 210, thereby preventing the situational light intensity at the corners of the display 210 from being lower than the situational light intensity at the top edge 210a and the side edge 210b.

Figure 16:
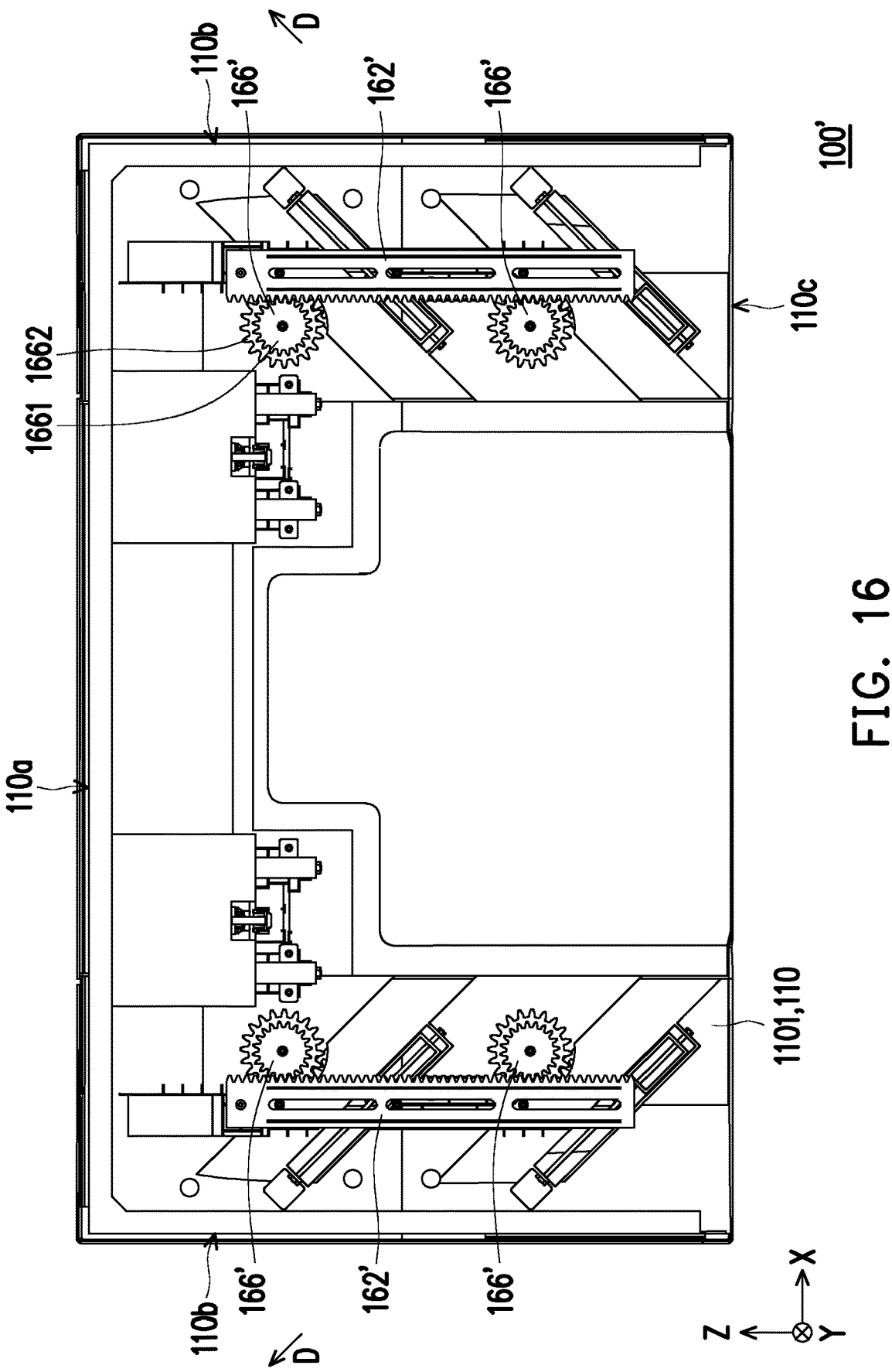
FIG. 16 is a front view of some components of a display device according to another embodiment of the invention.
Figure 17:
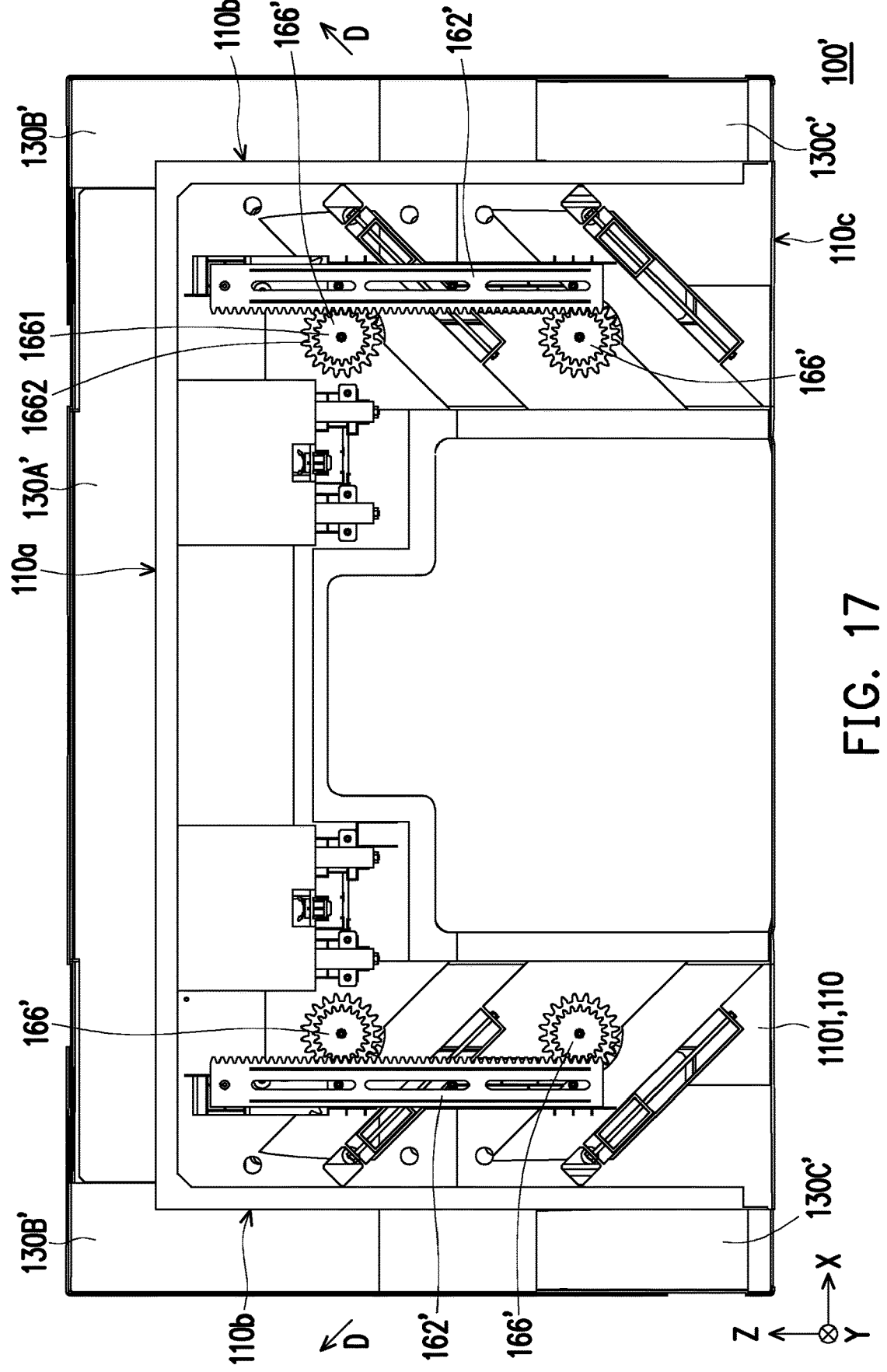
FIG. 17 illustrates a movement of the reflectors of FIG. 16.
Figure 18:
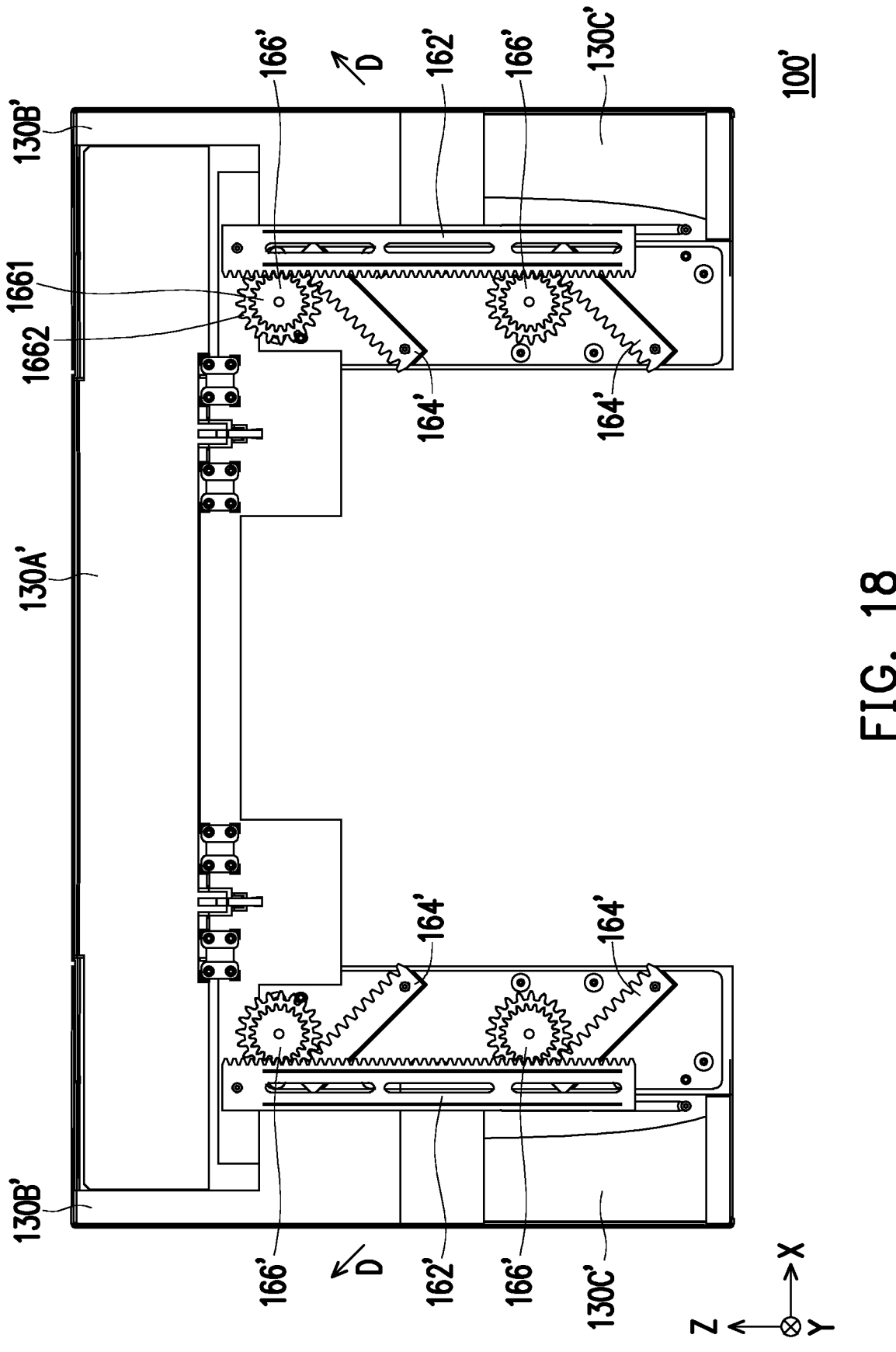
FIG. 18 and FIG. 19 respectively show internal components of the display device of FIG. 16 and FIG. 17.
Figure 19:
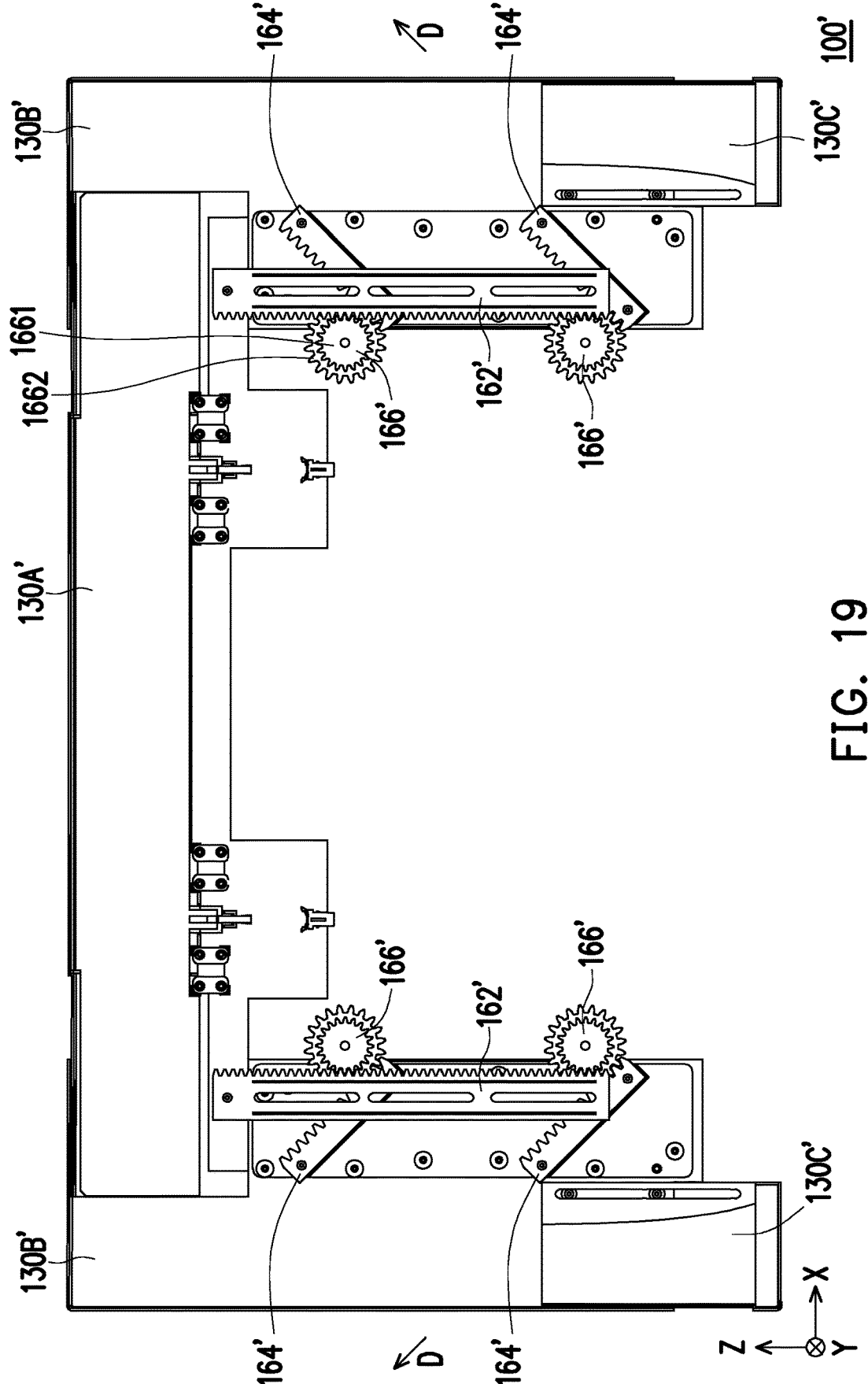

FIG. 16 is a front view of some components of a display device according to another embodiment of the invention. FIG. 17 illustrates a movement of the reflectors of FIG. 16. FIG. 18 and FIG. 19 respectively show internal components of the display device of FIG. 16 and FIG. 17. The display device 100' of the embodiment of FIGS. 16-19 is similar to the display device 100 of FIG. 1 to FIG. 14. In FIG. 16 to FIG. 19, the same or similar reference numerals denote the same or similar components of FIG. 1 to FIG. 14, and therefore, some components described with reference to FIG. 1 to FIG. 14 are not described herein again. The main difference between the embodiment of FIG. 16 to FIG. 19 and the embodiment of FIG. 1 to FIG. 14 will be described below.

Referring to FIG. 16 to FIG. 19, in the display device 100', each of the side edge reflectors 130B' is slidably arranged on the display 110 along the third direction D and may be expanded along the third direction D as shown in FIG. 18 and FIG. 19. The two corner reflectors 130C' are located at two opposite ends of the bottom edge 110c respective, and each of the corner reflectors 130C' is slidably arranged on the corresponding side edge reflector 130B' along the first direction (the axial direction Z) and separated from the top edge reflector 130A'. Each of the corner reflectors 130C' may be expanded along the second direction (the axial direction X) as shown in FIG. 18 and FIG. 19. Specifically, when the side edge reflector 130B' and the corner reflector 130C' are in the state shown in FIG. 16 and FIG. 18, a bottom edge of the corner reflector 130C' is supported by the display main body 1101 so as to prevent the corner reflector 130C' from sliding downward. When the side edge reflector 130B' is expanded along the third direction D, the corner reflector 130C' is moved with the side edge reflector 130B' and slides downward relatively to the side edge reflector 130B', such that a position of the corner reflector 130C' in the first direction (the axial direction Z) shown in FIG. 16 and FIG. 18 is the same as that shown in FIG. 17 and FIG. 19. Further, in the display device 100', each of the side edge reflectors 130B' is arranged with two second racks 164' and two gears 166'. Each of the second racks 164' is extended along the third direction D so as to drive the side edge reflector 130B' to move along the third direction D as described above. In addition, each of the gear 166 includes a first gear 1661 and a second gear 1662 which stack with each other and are meshed with the first rack 162' and the second rack 164' respectively.

In summary, in the display device of the invention, slidable reflectors are provided on the back surface of the display. When the light emitting elements on the back surface of the display do not need to be used to provide a situational light effect, the reflectors may be slid to a first position to hide the reflectors. When the light emitting elements on the back surface of the display need to be used to provide the situational light effect, the reflectors may be slid to a second position to expose the reflecting surfaces, so that the light emitted by the light emitting elements may be reflected to the user at the front of the display by the reflecting surfaces to provide the user with a prominent situational light effect.

What is claimed is:

1. A display device, comprising:
   a display, having a display surface and a back surface opposite to each other, wherein the display surface faces a front of the display;
   at least one light emitting element, disposed on the back surface; and
   at least one reflector, slidably connected to the back surface and having a reflecting surface, wherein when the at least one reflector slides to a first position, the reflecting surface is hidden, and when the at least one reflector slides to a second position, the reflecting surface is exposed, such that light emitted from the at least one light emitting element is reflected toward the front of the display by the reflecting surface, wherein the at least one reflector is located outside the display, wherein when the at least one reflector is in the first position and is retracted on the back surface, the reflecting surface is overlapped with the display in a direction perpendicular to the display surface.

2. The display device as claimed in claim 1, wherein the at least one reflector is slidably arranged on the display along a direction parallel to the display surface.

3. The display device as claimed in claim 1, wherein when the at least one reflector is in the second position and is expanded on the back surface, the reflecting surface is misaligned with the display in a direction perpendicular to the display surface.

4. The display device as claimed in claim 1, wherein the display has a top edge, a bottom edge opposite to the top edge and two opposite side edges, the top edge and the bottom edge are connected between the two side edges, the at least one reflector comprises a top edge reflector, at least one side edge reflector and at least one corner reflector, the top edge reflector corresponds to the top edge and is adapted to be expanded along a first direction, the at least one side edge reflector corresponds to the at least one side edge and is adapted to be expanded along a second direction or a third direction, the at least one corner reflector is located between the top edge reflector and the at least one side edge reflector or located at the bottom edge and is adapted to be expanded along the third direction or the second direction, the first direction is parallel to the display surface and perpendicular to the top edge, the second direction is parallel to the display surface and perpendicular to the at least one side edge, and the third direction is parallel to the display surface and inclined to the top edge.

5. The display device as claimed in claim 4, wherein a number of the at least one side edge reflector is two, the two side edge reflectors respectively correspond to the two side edges, a number of the at least one corner reflector is two, one corner reflector is located between the top edge reflector and one side edge reflector or located at an end of the bottom edge, and the other corner reflector is located between the top edge reflector and the other side edge reflector or located at another end of the bottom edge.

6. The display device as claimed in claim 4, wherein the top edge reflector is slidably arranged on the display along the first direction, the at least one side edge reflector is slidably arranged on the display along the second direction or the third direction, and the at least one corner reflector is slidably arranged on the top edge reflector along the second direction and slidably arranged on the at least one side edge reflector along the first direction, or is slidably arranged on the at least one side edge reflector along the first direction and separated from the top edge reflector.

7. The display device as claimed in claim 4, further comprising at least one push-push mechanism and at least one elastic component, wherein the at least one push-push mechanism is arranged on the display, the at least one elastic component is connected between the top edge side reflector and the display, the top edge reflector is adapted to be restricted by the at least one push-push mechanism to retract on the back surface, and when the top edge reflector is released by the at least one push-push mechanism, the top edge reflector is expanded on the back surface by an elastic force of the at least one elastic component.

8. The display device as claimed in claim 7, wherein the display includes a display main body and at least one sliding rail, the at least one sliding rail is arranged on the display main body, the top edge reflector is slidably arranged on the at least one sliding rail, and the at least one elastic component is arranged in the at least one sliding rail.

9. The display device as claimed in claim 4, further comprising at least one linkage mechanism, wherein the at least one linkage mechanism is coupled between the top edge reflector and the at least one side edge reflector, and the top edge reflector and the at least one side edge reflector are adapted to be linked by the at least one linkage mechanism.

10. The display device as claimed in claim 9, wherein the at least one linkage mechanism comprises a first rack, at least one second rack and at least one gear, the first rack is arranged on the top edge reflector, the at least one second rack is arranged on the at least one side edge reflector, and the at least one gear is arranged on the display and meshes between the first rack and the second rack, wherein the first rack is extended along the first direction, and the at least one second rack is extended along the second direction or the third direction.

11. The display device as claimed in claim 4, wherein a number of the at least one light emitting element is plural, and the light emitting elements are distributed on the top edge and the at least one side edge.

12. The display device as claimed in claim 11, wherein the display has a first carrying surface, at least one second carrying surface and at least one third carrying surface, the first carrying surface corresponds to and is parallel to the top edge, the at least one second carrying surface corresponds to and is parallel to the at least one side edge, the at least one third carrying surface is connected between the first carrying surface and the at least one second carrying surface and is inclined to the first carrying surface and the at least one second carrying surface, and the light emitting elements are arranged on the first carrying surface, the at least one second carrying surface and the at least one third carrying surface.

13. The display device as claimed in claim 1, further comprising at least one light equalizing element, wherein the at least one light equalizing element is disposed between the at least one light emitting element and the reflecting surface.

14. The display device as claimed in claim 1, wherein the at least one light emitting element corresponds to a peripheral region of the display surface, and the at least one light emitting element is adapted to emit corresponding color light according to a color displayed by the display surface on the peripheral region.

15. A display device, comprising:

a display, having a display surface and a back surface opposite to each other, and having two opposite side edges, wherein the display surface faces a front of the display;

a plurality of light emitting elements, arranged on the back surface and distributed on the two side edges; and two side edge reflectors, slidably connected to the display and respectively corresponding to the two side edges, wherein each of the side edge reflectors has a reflecting surface, and is adapted to be retracted on the back surface to hide the reflecting surface, each of the side edge reflectors is adapted to be expanded on the back surface to expose the reflecting surface, such that light emitted by the corresponding at least one light emitting element is reflected toward the front of the display by the reflecting surface.

16. The display device as claimed in claim 15, wherein each of the side edge reflectors is slidably arranged on the display along a direction parallel to the display surface.

17. The display device as claimed in claim 15, wherein when each of the side edge reflectors is retracted on the back surface, the reflecting surface is overlapped with the display in a direction perpendicular to the display surface.

18. The display device as claimed in claim 15, wherein when each of the side edge reflectors is expanded on the back surface, the reflecting surface is misaligned with the display in a direction perpendicular to the display surface.

19. The display device as claimed in claim 15, further comprising at least one light equalizing element, wherein the at least one light equalizing element is disposed between the reflecting surface and the corresponding at least one light emitting element.

\* \* \* \* \*